United States Patent [19]
Jenkins

[11] 4,339,408
[45] Jul. 13, 1982

[54] METHOD FOR MOLDING STRAIGHT RIBBED ARTICLES

[75] Inventor: Thomas E. Jenkins, Louisville, Ky.

[73] Assignee: General Electric Company, Louisville, Ky.

[21] Appl. No.: 203,014

[22] Filed: Nov. 3, 1980

[51] Int. Cl.³ .............................................. B29F 1/14
[52] U.S. Cl. ........................... 264/328.7; 264/328.8; 264/328.12; 264/334; 425/555
[58] Field of Search ...................... 425/555; 264/328.7, 264/328.8, 328.13, 334

[56] References Cited
U.S. PATENT DOCUMENTS

| | | | |
|---|---|---|---|
| 3,670,066 | 6/1972 | Valyi | 264/328.7 X |
| 3,822,029 | 7/1974 | Butsch | 220/72 |
| 3,826,553 | 7/1974 | Cushing | 312/253 |
| 3,905,740 | 9/1975 | Lovejoy | 425/438 |

FOREIGN PATENT DOCUMENTS 912695 12/1962 United Kingdom ........... 264/328.13

*Primary Examiner*—Thomas P. Pavelko
*Attorney, Agent, or Firm*—H. Neil Houser; Radford M. Reams

[57] ABSTRACT

A method of molding a hollow, plastic article having ribs extending from its walls comprising the steps of positioning the mold cavity forming members in a closed position to define a mold cavity corresponding to the configuration of the article; injecting molten thermoplastic material into the cavity; allowing the material to cool for a predetermined period of time to permit partial cooling and setting of the plastic; injecting additional plastic material into the rib forming portion of the mold cavity at a plurality of injection points spaced along the rib portion; pausing for a second predetermined time to permit complete setting of the plastic in the mold; displacing the cavity defining members from their closed position and exerting an ejecting pressure on the rib portion at the plurality of injection points along its length to aid in ejecting the article from the mold.

3 Claims, 8 Drawing Figures

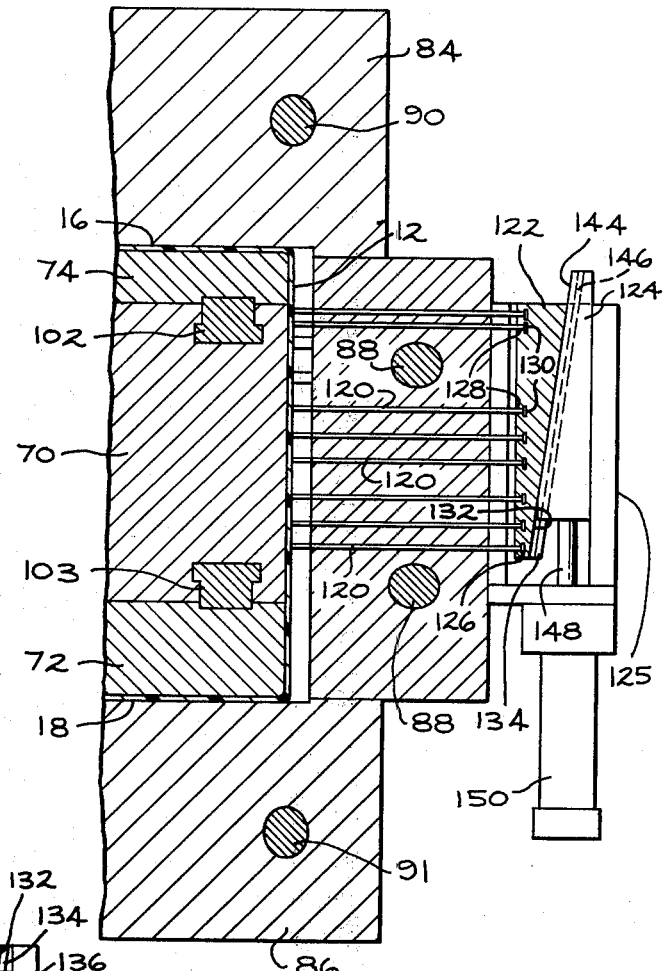
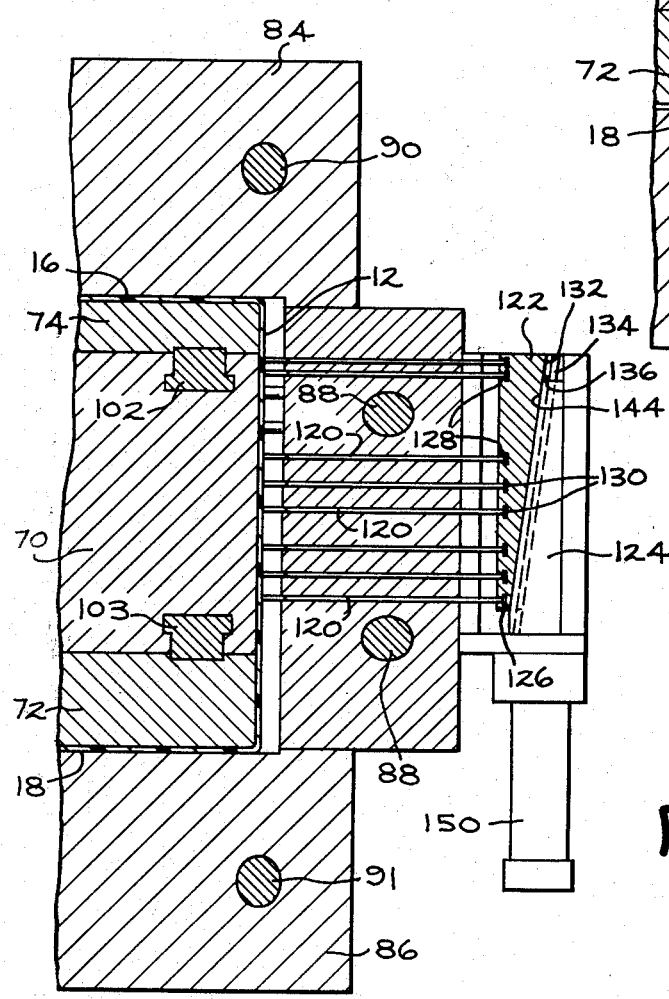

METHOD FOR MOLDING STRAIGHT RIBBED ARTICLES

The present invention relates generally to methods and apparatus for manufacturing plastic articles and more particularly to improved methods and apparatus for manufacturing plastic articles having ribs integrally formed with and extending from wall portions.

BACKGROUND OF THE INVENTION

The molding of plastic parts having one or more rib sections projecting orthogonally from a wall portion frequently involves problems of warping, sink marks and shrinkage because of the non-uniform cooling rate for the molded article. This is particularly true in instances where the rib portion is thicker than the wall portion, as is often necessary, in order to get sufficient strength of the rib section. Because of the thickness of this region, the rib section continues to cool and shrink after the wall has stopped shrinking, causing bowing or warping of the wall as well as sink marks. The removal of the molded part from the mold cavity without separating the rib portion from the wall portion also presents problems.

These problems are significant in the molding of plastic dishwasher tubs. Plastic dishwasher tubs are known in the art as exemplified by commonly-assigned U.S. Pat. Nos. 3,822,029 to Butsch, 3,826,553 to Cushing, 3,844,441 to Clark, and 4,295,692 to Jenkins. These dishwasher tubs include relatively large generally planar wall portions. Molding apparatus for forming plastic dishwasher tubs of the aforementioned type is disclosed in U.S. Pat. No. 3,905,740 to Walter R. Lovejoy. The Lovejoy apparatus works satisfactorily for tubs of the non-ribbed type. However, where it is desirable to enhance the structural rigidity of the plastic tub by adding structural support ribs on the tub walls, the problem of warped walls and sink marks becomes significant. In addition to the unsightly appearance of a dishwasher tub having warped walls and sink marks, warped walls could also cause distortion of the access opening to the tub, making a tight sealing fit of the door difficult to maintain. A method of molding such plastic articles which minimizes wall warppage and unsightly sink marks is clearly desirable.

It is therefore an object of the present invention to provide a method of manufacturing molded plastic articles such as dishwasher tubs having generally planar wall portions with extending ribs which reduces wall warppage and sink marks caused by uneven cooling of the wall and rib portions.

It is a further object of the present invention to provide improved molding apparatus for molding plastic articles such as dishwasher tubs of the aforementioned type.

SUMMARY OF THE INVENTION

In accordance with a preferred embodiment of the present invention, the method of molding a plastic dishwasher tub having ribs extending from the tub walls comprises the steps of positioning the mold cavity forming members in a closed position to define a mold cavity corresponding to the configuration of the dishwasher tub; injecting molten thermoplastic material into the cavity; allowing the material to cool for a predetermined period of time to permit partial cooling and setting of the plastic; injecting additional plastic material into the rib forming portion of the mold cavity at a plurality of injection points spaced along the rib portion; pausing for a second predetermined period of time to permit complete setting of the plastic in the mold; displacing the cavity defining members from their closed position and exerting an ejecting pressure on the rib portion at the plurality of injection points along its length to eject the tub from the mold.

Apparatus illustratively embodying the apparatus of the present invention and operative to illustratively demonstrate the method of the present invention comprises mold means, including a rib forming member defining a rib cavity having formed at spaced intervals along its length a plurality of boss cavity defining channels extending from the adjoining wall cavity through and beyond the rib cavity generally parallel to the plane of the rib cavity and extending at an angle to the plane of the wall cavity. An injection member is slidably received in each of these channels for movement between an initial position remote from the wall and rib cavity, an ejecting position projecting into the rib cavity, and an injecting position therebetween. Means are provided to simultaneously move each of the injection members from one position to another at predetermined times in the molding operation.

When the mold means are in the closed position at the beginning of the molding operation, the injection members are in their initial position remote from the rib cavity. With the members in this position each channel provides a boss cavity for receiving plastic material which extends from the rib cavity. During the molding operation at a predetermined time, each of the injection members is simultaneously moved from its initial position to its injection position, thereby decreasing the boss cavity and compressing the plastic in the boss cavity and transferring a portion of it from that portion of the boss cavity extending beyond the rib cavity into the rib cavity. At the end of the molding operation after a subsequent predetermined time, each injection member is simultaneously moved to its ejecting position in which the injection members extend into the rib cavity sufficiently to eject the rib portion of the tub from the rib cavity.

BRIEF DESCRIPTION OF THE DRAWINGS

FIG. 6 is a fragmentary sectional view of the mold apparatus of FIG. 3 taken along lines 6—6 of FIG. 5 and showing mold members in the closed position and injecting pins in the initial position.

FIG. 7 is a fragmentary sectional view similar to that of FIG. 6 with injecting pins in the injection position.

DETAILED DESCRIPTION OF THE INVENTION

Figure 1:
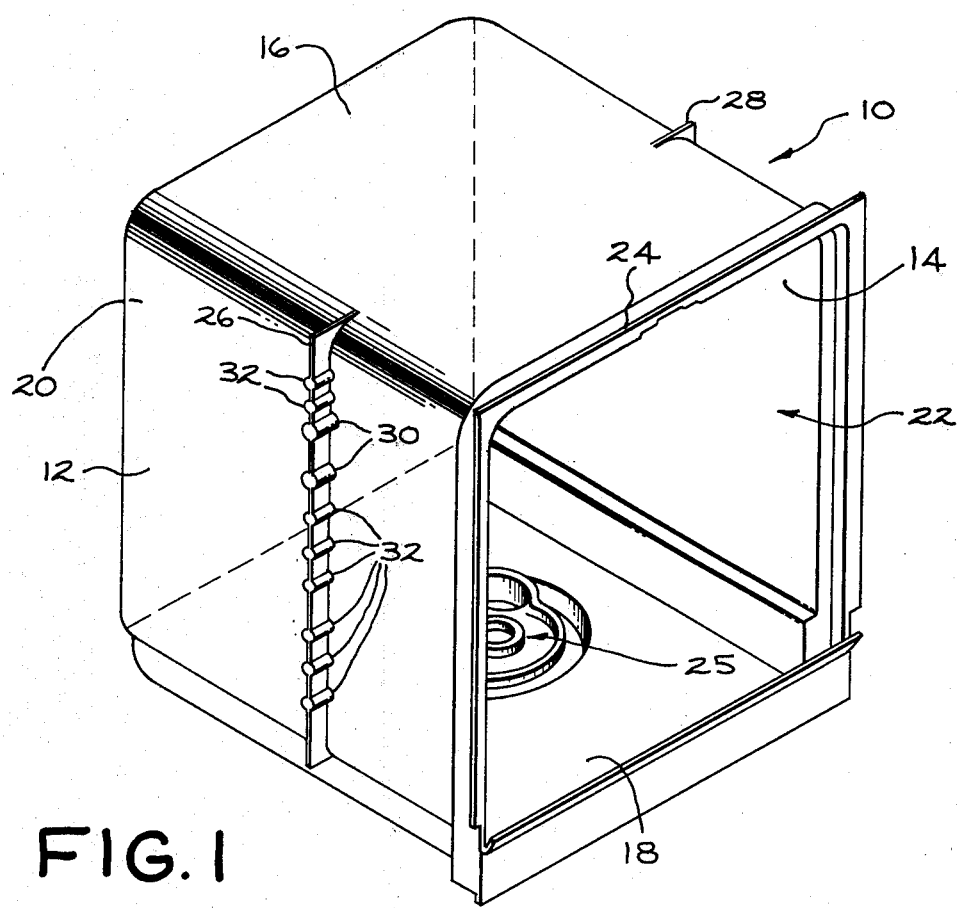
FIG. 1 is a perspective view of a representative molded plastic article made pursuant to the method of the present invention.

Referring now to FIG. 1, there is shown a simplified sketch in perspective of a plastic dishwasher tub of the type manufactured in accordance with an illustrative embodiment of the method and apparatus of the present invention. Dishwasher tub 10 is of generally rectangular box-like configuration having side walls 12 and 14, top wall 16, bottom wall 18, rear wall 20, and an open front 22 about which if formed an externally flared circumferential flange 24. Bottom wall 18 is sculptured and apertured, as shown generally at 25, to accommodate certain dishwasher apparatus (not shown). Side walls 12 and 14 are of generally planar configuration. Straight ribs 26 and 28 are formed on side walls 12 and 14, respectively extending orthogonally therefrom to provide additional structural support for the tub. Rack support bosses 30 are formed along ribs 26 and 28 to serve as points of attachment for dishwasher upper rack support means (not shown). A plurality of generally cylindrical injection bosses 32 are spaced along the length of ribs 26 and 28. The axes of said bosses are parallel to the plane of the ribs projecting at an angle, preferably a right angle, to tub walls 12 and 14. These bosses are a result of the molding technique employed in accordance with the present invention to combat problems of wall warppage and sink marks.

Figure 2:
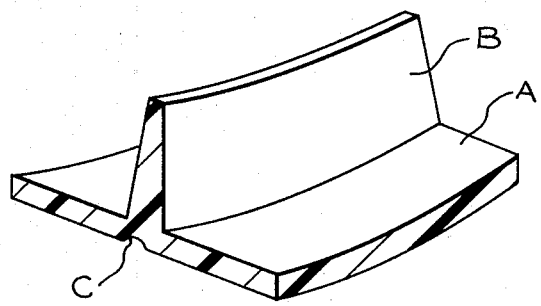
FIG. 2 is a schematic representation of a sample portion of a molded rib and wall structure demonstrating wall warp and sink marks.

As mentioned briefly in the Background discussion, warped walls and sink marks are problems when molding a straight rib portion with a planar wall portion especially when the rib portion is thicker than the wall portion, as is frequently the case, in order to insure adequate filling of the rib section with the molten thermoplastic material because the plastic material shrinks as it cools. When the rib section is thicker and because the rib sections, particularly if there is a plurality of such ribs, are more difficult to cool, the rib section tends to cool more slowly after the injection of the molten plastic than does the wall portion. Consequently, the rib section continues to cool and shrink after the wall portion has stopped shrinking, causing bowing of the wall portion as well as sink marks. In FIG. 2, a sample section of a conventionally formed plastic wall and rib combination is shown illustrating the bowing of the wall A toward the rib B, and also showing a sink mark C formed on the interior of the tub wall caused by the shrinking of the rib section after the wall has fully shrunk. In accordance with the method of the present invention, the tendency of the wall to bow is countered by injecting additional plastic into the rib at the injection boss locations during cooldown. The addition of plastic after shrinkage has started to occur compensates for the shrinkage, relieving the warping stresses and filling the sink marks caused by the uneven shrinkage.

Figure 3:
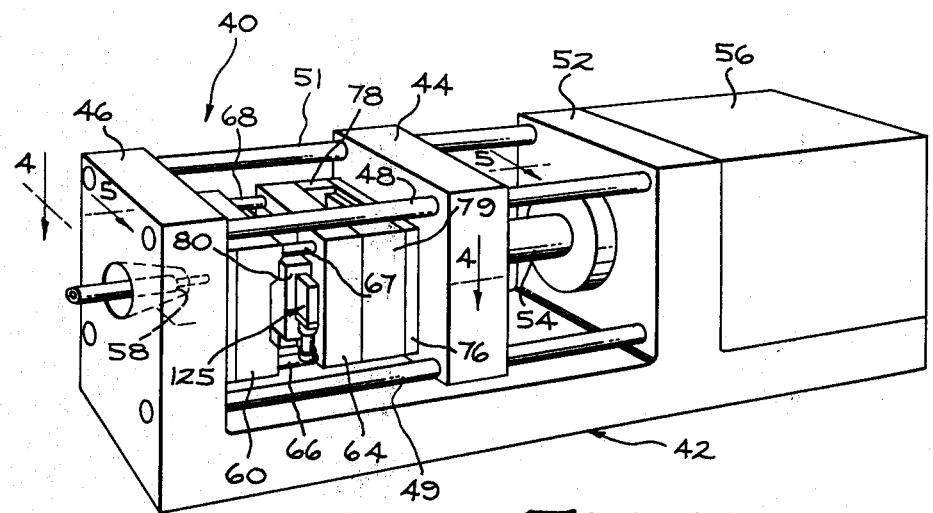
FIG. 3 is a perspective view of molding apparatus illustratively embodying the apparatus of one form of the present invention and employed in carrying out a method of manufacture in accordance with one embodiment of the present invention.

FIG. 3 is a simplified illustration of a molding apparatus 40 embodying one form of the present invention and used to manufacture the plastic tub 10 of FIG. 1 in accordance with one embodiment of the method of the present invention. Mold 40 is shown supported in a horizontal hydraulic molding press 42 of conventional design with separable sections of mold 40 carried respectively by a slidably movable platen 44 and a similarly sized fixed platen 46 disposed in opposed facing relation to platen 44. A set of four horizontal guideposts 48–51, three of which are visible in FIG. 3, are fixedly secured adjacent the four corners of platen 46 and extend in parallel relation through movable platen 44 and are fixedly secured in a stationary backing plate 52. Platen 44 is slidably movable along guideposts 48–51 between a closed or molding position as shown in FIG. 3 and an open position with platen 44 withdrawn to the right, as seen in FIG. 3. Platen 44 moves under the influence of a piston arm 54 that is powered by a hydraulic cylinder located in housing 56 of press 42. The molten thermoplastic material is introduced into the molding cavity of mold 40 through a primary inlet sprue 58 which enters the mold structure from the back side of platen 46.

Figure 4:
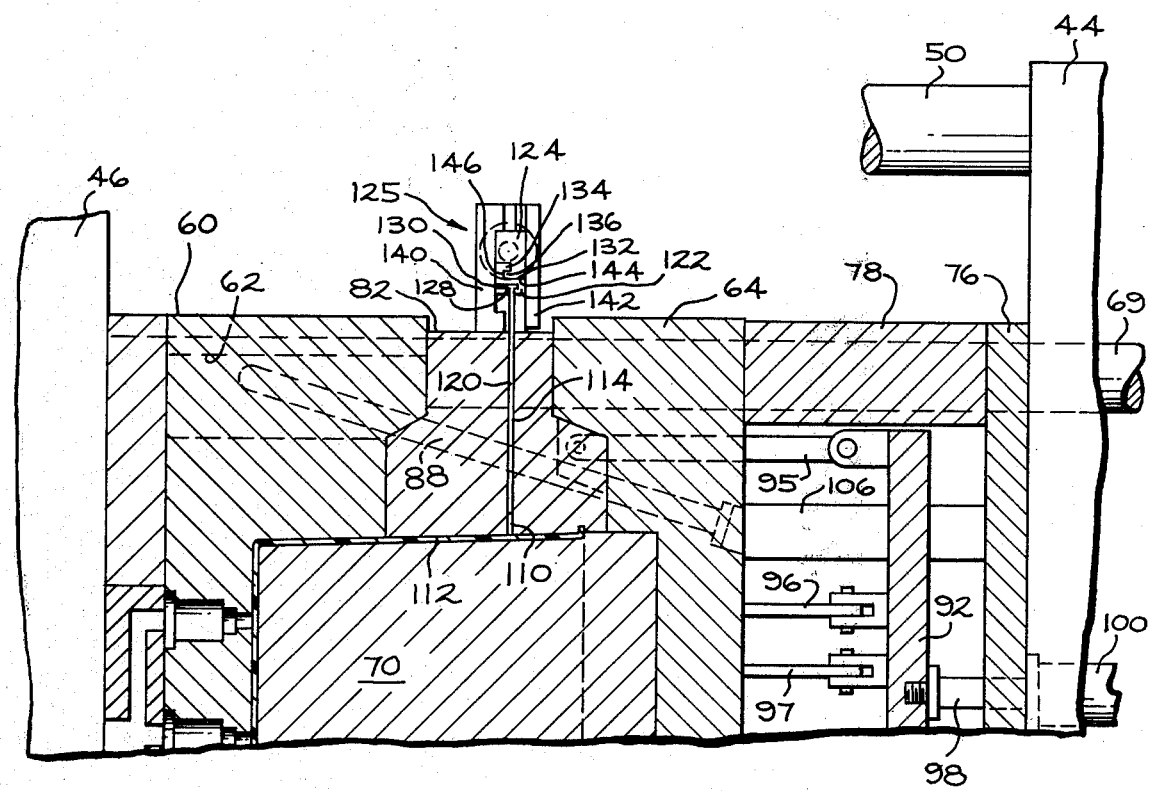
FIG. 4 is a partial sectional view of the mold apparatus of FIG. 3 taken along lines 4—4 and showing the mold members in a closed position.

Referring now to FIGS. 3 and 4, mold 40 comprises a plurality of mold cavity forming members which when the mold is closed cooperate to define a mold cavity corresponding to the configuration of the dishwasher tub. Mold member 60 fixedly secured to platen 46 has a mold defining surface corresponding to the exterior dimensions of rear wall 20 and portions of walls 12, 14, 16, and 18. Mold member 60 is also provided with appropriate clearance bores designated 62 (FIG. 4) for a series of inclined guideposts carried on the mating mold section to be described in more detail.

A second mold member 64 is fixedly secured to the movable platen 44 and is disposed in opposed facing relation to mold member 60. Member 64 is of an enlarged generally plate-like configuration having a planar back wall and a flanged forward wall contoured complementary to that of the opposed portion of member 60.

Mold member 64 is slidably carried on a second set of four rectangularly arrayed guideposts 66–69 that are spaced well within the perimeter of the first guidepost array 48–51. Three of these guideposts 66, 67 and 68 are seen in FIG. 3. Guideposts 66–69 each have one end fixedly secured in mold member 60 and extend therefrom through respective bores in mold member 64 and guide bores in movable platen 44.

Mold member 64 supports the core forming members, one of which designated 70 is visible in FIG. 4. Core member 70 is fixedly secured to mold member 64 and is the central one of a trio of core elements, the outer elements 72 and 74 (FIG. 5) being movable relative to central core member 70 to enable release of the molded tub from the mold.

The control mechanism for actuation of the movable core elements and side wall mold members, presently to be described, is positioned rearwardly of mold member 64. To accommodate movement of this control mechanism, there is provided a spacer structure between platen 46 and the back side of member 64. The spacer structure comprises a backing plate 76 that is both contiguous and affixed to movable platen 44 and spacer blocks 78 and 79 interposed in a rectangular array between platen 44 and the backside of mold member 64.

The mold apparatus of FIG. 3 is essentially symmetrical. For simplicity, in FIGS. 4 and 6–8 one half of the sectional view is cut away. while the description is directed to the half shown, it is to be understood that the portion not shown is a mirror image of that which is shown and described.

Figure 5:
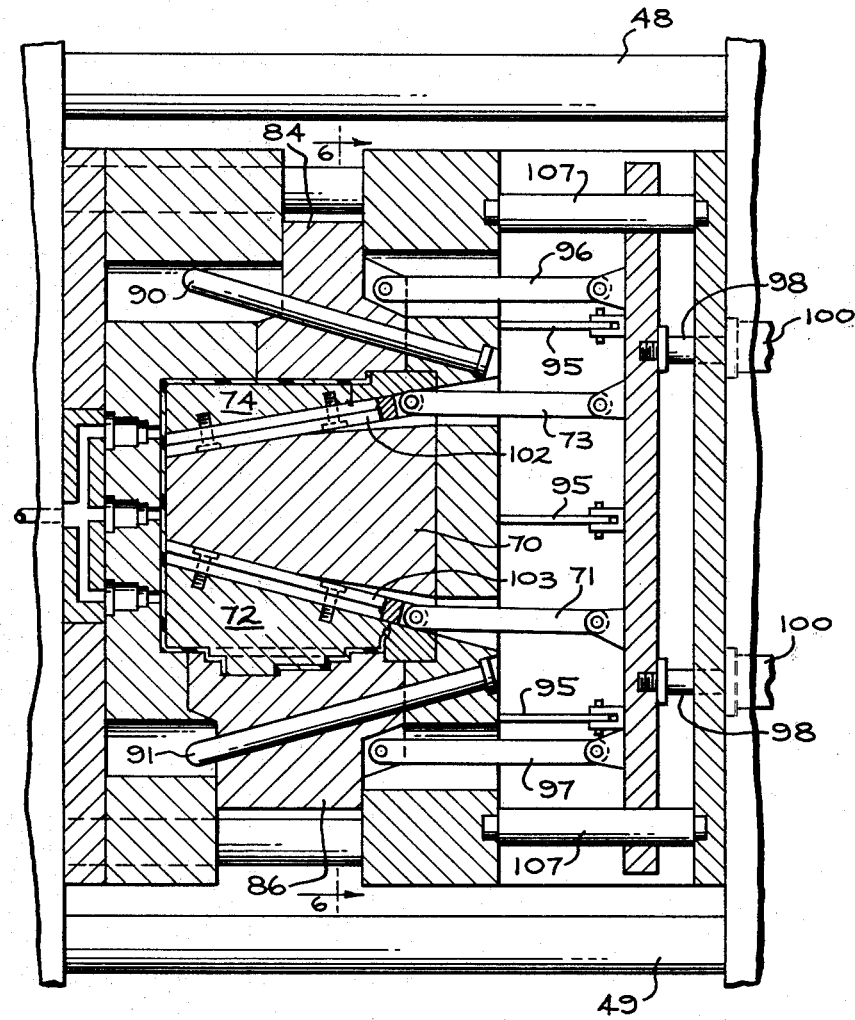
FIG. 5 is partial sectional view of the mold apparatus of FIG. 3 taken along lines 5—5 of FIG. 3.

Referring now to FIGS. 4, 5, and 6, mold 40 further includes four separable side wall members 80, 82, 84 and 86, one of which is visible in FIG. 4. The two side wall members 84 and 86 are visible in FIG. 5. The side wall members 80, 82, 84 and 86 are interposed between mold members 60 and 64 and in the closed position of the mold shown in FIG. 4 cooperate with mold member 60 to define the exterior side wall contour of the molded tub 10.

The side wall members are each supported and guided by respective pairs of guide rods. Guide rod 88 of side wall member 80 is shown in phantom in FIG. 4. Similarly, guide rods 90 and 91 constituting one of the guide rods for each of side wall members 84 and 86, respectively, can be seen in FIG. 5.

The root portions of each of the guide rods are securely journalled in bores extending through mold member 64 with the cantilevered forward portions of the guide rods inclined outwardly from their respectively adjacent side walls. Each of the guide rods terminates in a clearance bore of mold member 60.

Movement of the side wall members between their open and closed positions is effected by means of mechanical linkages coupled between the respective side wall elements and an ejection plate 92. For example, linkage element 95 has one end pivotally connected to ejection plate 92 and its opposite end pivotally connected to side wall member 82. Displacement of ejection plate 92 effects a movement of side wall member 82 by a distance corresponding to the movement translated through mechanical linkage element 95. The movable components of the mold cores are likewise coupled to ejection plate 92 by suitable linkages as will presently be explained.

Ejection plate 92 is slidable between a first position shown in FIG. 4 wherein it is adjacent back plate 52 and a second position wherein plate 92 abuts the back side of mold member 64. Ejection plate 92 is displaced between these positions by a pair of piston arms 98 of conventional hydraulic cylinder 100. Hydraulic cylinders 100 are actuated by a conventional microswitch (not shown) that is positioned so as to be operated when mold member 64 reaches a predetermined location in the course of travel between its closed and open positions. Ejection plate 92 is guided in its movements by a series of guide rods, an exemplary one of which 106 is visible in FIG. 4. The ends of guide rod 106 are secured respectively in mold member 64 and backing plate 76.

Referring now to FIG. 5, further elements of mold 40 are visible. Specifically, side wall members 84 and 86 are pivotally connected by respective linkages 96 and 97 to ejection plate 92 in the same manner as side wall members 80 and 82. The linkage elements are arranged such that, with a given increment of movement of ejection plate 92, side wall members 80, 82, 84, and 86, respectively, each moves an equal longitudinal distance, as is essential to avoid damage to the plastic tub 10.

Two movable components 72 and 74 of core means, as well as fixed control core member 70, are likewise visible in FIG. 5. Central core member 70 is of generally trapezoidal cross-section having opposed side walls sloping inwardly toward one another. Core members 72 and 74 are of a right triangular configuration and are disposed with their hypotenuse side walls in contiguous relation to the opposed sloping side walls of fixed member 70. The core members 72 and 74 are interlocked to the fixed member 70 through T-type interlock slides 102 and 103, respectively, for permitting a relative sliding movement between the fixed member 70 and side core members 72 and 74.

Core members 72 and 74 are connected by respective pivotally mounted linkage arms 71 and 73, respectively, to ejection plate 92 in a manner identical to that of the side walls. The core member linkage arms are arranged so that for a given increment of movement of ejection plate 92, each of the core elements moves longitudinally the same distance as each of the side wall members, despite a disparity in the length of lateral movement between these members, so as to prevent damage to tub 10 during ejection.

Mold 40 is shown in its closed position in FIG. 4. To open the mold, piston arm 54 of hydraulic control apparatus is retracted. Mold members 60 and 64 separate under the influence of piston arm 54 drawing movable platen 44 and mold components supported thereon toward backing plate 52. As the opening progresses to a predetermined position, a microswitch (not shown) is operated to actuate hydraulic cylinder 100. The resultant outward movement of piston 98 of cylinder 100 displaces ejection plate 92 toward the back side of mold member 64 resulting in movement of each of the linkage elements pivotally connected to plate 92 and thus movement of the side walls and movable core elements in a like direction.

Each of side wall members 80, 82, 84, and 86 moves along a similar inclined path established by the respective guide rods, associated with each side wall member. Core members 72 and 74 likewise move along inclined paths established by the slope of the opposed surfaces of fixed core member 70.

The structure of mold 40 as described thus far is described in detail in U.S. Pat. No. 3,905,740 to Walter R. Lovejoy and assigned to Beatrice Foods Company, the disclosure of which is hereby incorporated by reference. The balance of the description to follow focuses on the additional structure of mold 40 which is not disclosed in the Lovejoy patent and which illustratively embodies the present invention.

Figure 8:
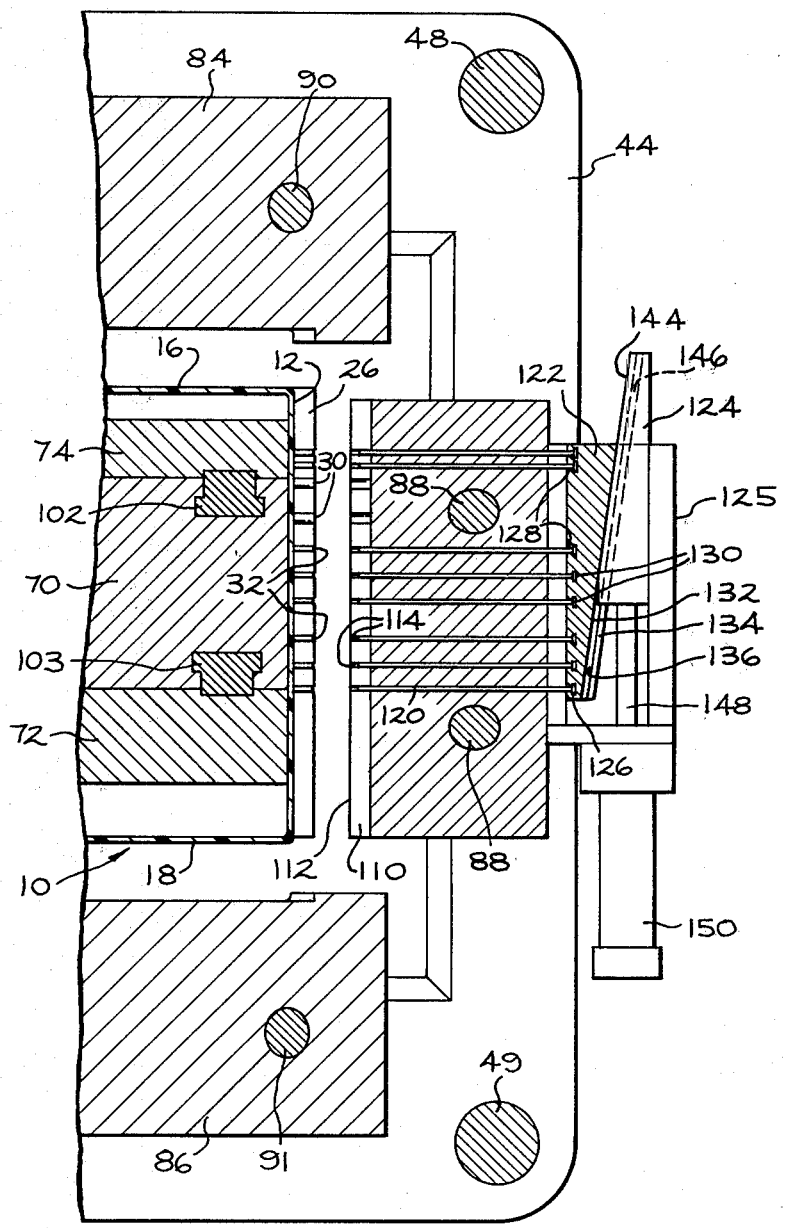
FIG. 8 is a fragmentary sectional view similar to FIG. 7, but showing the injecting pins in the ejection position.

As best seen in FIGS. 4 and 8, side wall mold member 82 also constitutes the rib forming member in this illustrative embodiment. For purposes of the present discussion, only side wall member 82 and associated apparatus is described. It is to be understood, however, that the description is equally applicable to side wall member 80 and its associated components as well.

A slightly tapered groove 110 cut in the wall defining surface 112 of side wall member 82 running the length thereof defines the rib cavity. Groove 110 is preferably cut at a right angle to side wall cavity defining surface 112 of side wall member 82 which cooperates with core members 70, 72 and 74 to define the side wall cavity for side wall 12 of tub 10.

Rib forming member 82 has a plurality of embossment forming portions preferably in the form of generally cylindrical boss cavity defining channels 114 formed at spaced intervals along the length of the rib forming cavity 110. Each channel 114 has its longitudinal axis lying in the plane of the rib cavity 110. Channels 114 extend through side wall member 82 and are adapted to slidably receive injection members. The injection members comprise elongated pins or rods 120 having a head 126 formed at one end. Pins 120 are movable between an initial position relatively remote from the main rib cavity as shown in FIG. 6, an ejection position projecting substantially into the rib cavity as seen in FIG. 8, and an injecting position between the initial position and the ejecting position shown in FIG. 7.

Means for moving pins 120 between these positions is provided by the camming action of wedge members 122 and 124 supported in housing 125. Wedge member 122 includes a plurality of apertures 128, terminating in slots 130. The rod portion of each pin is received in a corresponding one of apertures 128 with the head 126 being captured in the corresponding one of slots 130 for axial movement in concert with the movement of wedge member 122. Wedge member 122 is supported in housing 125 for horizontal sliding movement as viewed in FIGS. 6-8. A ramp 132 is formed on the face of wedge member 122 facing away from pins 120. A reverse flange 134 formed along the edge of ramp 132 defines a track or groove 136 running the length of ramp 132 along the edge thereof.

Driving wedge member 124 is supported in housing 125 adjacent wedge member 122 for vertical sliding movement as viewed in FIG. 6. A ramp 144 of complimentary contour to ramp 132 is formed on driving wedge 124 facing ramp 132. A track engaging extension 146 formed along the length of ramp 144 rides in track 136 of wedge member 122. As wedge member 124 moves vertically from a first or lowermost portion as seen in FIG. 6 to a second position fully upwardly extended as seen in FIG. 8, wedge member 122 is moved horizontally by camming action, thereby carrying pins 120 from their initial position to their ejection position. Similarly, placement of wedge member 124 at a third position between the first and second positions as seen in FIG. 7 places pins 120 in their injection position.

Wedge member 124 is displaced between its positions by a piston arm 148 of a conventional hydraulic cylinder 150. The hydraulic cylinder may be actuated in a conventional manner such as by microswitches (not shown) positioned so as to be operated when wedge member 124, or possibly wedge member 122, reaches certain predetermined locations in the course of travel between their positions.

A method of manufacturing dishwasher tubs exemplifying the method of the present invention will now be described with reference to mold 40.

To manufacture dishwasher tubs of the type illustrated in FIG. 1, mold 40 is placed in its closed position with cavity forming mold members 46, 70, 72, 74, 80, 82, 84 and 86, positioned as shown in FIGS. 4 and 5 to define a mold cavity corresponding to the configuration of the dishwasher tub 10. At this point in the mold operation, pins 120 are in their initial position relatively remote from the rib cavity, as in FIG. 6. Molten thermoplastic material at a temperature of approximately 500° F. is then injected into the mold cavity through inlet sprue 58 at a pressure on the order of 20,000 psi at the sprue. Following injection into the mold, plastic material is allowed to cool for a predetermined period sufficient to permit partial cooling and setting of the material. In the present case, satisfactory results were achieved employing an initial cooling period on the order of 10 seconds. At the end of the predetermined cooling period, piston arm 148 moves wedge 124 upwardly a predetermined distance, as seen in FIG. 7, causing wedge 122 to simultaneously move pins 120 to their injection position as shown in FIG. 7. Movement of pins 120 applies an axial force to the plastic material contained in the boss cavities, thereby forcing the plastic material out of the boss cavities and injecting it into the rib cavity at the injection points spaced along the length of the rib cavity. Pins 120 remain in this injecting position for a predetermined period sufficient to permit the material to fully set. In the dishwasher case, complete set of the material required a total time of approximately one minute. Thus, a pause on the order of 45-60 seconds after placing the pins in the injection position to permit full set of the materials is preferred.

The mold operation is completed with ejection of the dishwasher tub from the mold. As previously described, to open the mold, piston 54 draws movable platen 44 and the mold components supported thereon toward backing plate 52, causing separation of mold members 60 and 64. As platen 44 moves to a certain point, hydraulic cylinders 100 and 150 are actuated. Actuation of cylinder 100 causes piston arm 98 to displace ejection plate 92 toward the back side of mold member 64, causing movement of the side wall and movable core components in like direction. Actuation of hydraulic cylinder 150 causes piston arm 148 to move wedge 124 to its uppermost position thereby moving pins 120 from their injection position to their ejection position shown in FIG. 8. In moving from their injection position to their ejection position, pins 120 force rib section 26 of dishwasher tub 10 from the rib cavity. This ejecting action of the pins prevents separation of the rib from the tub such as could result from the rib section sticking in the rib cavity as the mold opens to eject the tub.

As previously mentioned, additional plastic is injected at the injection boss locations along the rib cavity according to the present invention in order to counter the tendency of the wall to bow or warp due to the uneven cooling rate of the rib and wall. The additional plastic material injected along the rib compensates for shrinking of the rib as it cools. The number and spacing of the injection bosses along the rib cavity determines the first order straightening effect, with a second order adjustment being determined by the amount of plastic injected at these locations. The spacing of the bosses needed to provide the desired straightening effect is dependent upon the thickness, taper and height of the ribs and the thickness of the adjacent wall portion.

When molten plastic is initially injected into the rib forming portion of the mold cavity, the injection pins are positioned such that the injection boss cavities extend from the wall portion through and beyond the main rib cavity. These boss cavities are initially filled with molten plastic along with the rest of the mold cavity. At a particular time in the cooling process, the plastic in the extremities of the boss cavities is injected into the rib portion by movement of pins 120 to their injection positions to apply axial pressure to compress the bosses. As mentioned above, a second order straightening effect is determined by the amount of plastic injected into the rib cavity from the boss cavities which in turn is determined by the extent to which the bosses are compressed or, more specifically with reference to the illustrative embodiment described herein, by the extent of injection pin movement. The amount of plastic injected is determined by the displacement of the pins in moving from the initial position to the injection position. Thus, the amount of plastic to be injected may be varied as desired by varying the injection position. In the case of the illustrative dishwasher tub embodiment, satisfactory straightening was achieved for a rib of thickness 0.150 inches at the base and 0.12 inches at the top, a height of 1.1 inches and a tub wall thickness of 0.1 inches, using pins spaced roughly 2 inches apart. In the case of the exemplary dishwasher tub, the bosses, roughly ¼ inch in diameter, initially extend ¼ inch beyond the main rib. After compression the bosses are roughly even with the outer edge of the main rib.

While in accordance with the Patent Statutes, I have illustrated and described specific embodiments of my invention, it is realized that numerous modifications and changes will occur to those skilled in the art. For example, while the method and apparatus of the present invention is clearly advantageous in molding plastic dishwasher tubs as illustrated herein, the utility of the invention extends to the manufacture of a wide variety of molded plastic articles comprising a rib portion extending from a wall portion. Additionally, the method and apparatus of the present invention are compatible with other plastic molding equipment known in the molding industry which may vary considerably in structure and manner of operation from that herein described. It is therefore to be understood that the appended claims are intended to cover all such modifications and changes as fall within the true spirit and scope of the invention.

What is claimed is:

1. A method of manufacturing a plastic article having at least one substantially planar wall portion with at least one integrally molded rib portion extending from the wall portion, said method comprising the steps of:

positioning mold means, comprising a plurality of mold cavity forming members, in a closed position to define a mold cavity corresponding to the configuration of the plastic article, said cavity including a rib forming portion, the rib forming portion including a main rib forming portion and a plurality of embossment forming portions extending from and distributed at spaced intervals along the length of the main rib forming portion, and having a plurality of pins spaced along its length in alignment with the embossment forming portions for axial movement substantially in the plane of the rib;

injecting molten thermoplastic material under pressure into the mold defining cavity;

cooling said thermoplastic material for a predetermined period of time;

simultaneously injecting a predetermined volume of thermoplastic material from the embossment forming portions into the main rib forming portion of the mold cavity by moving the pins in an injecting direction toward the rib portion a first predetermined distance corresponding to the volume of plastic to be injected; and ejecting the article by displacing the plurality of mold cavity defining members from their closed position and exerting a pressure on the rib portion of the article at the plurality of embossment portions formed along the rib portion by moving the pins a second predetermined distance in the injection direction thereby forcing the rib portion from the rib forming portion of the mold cavity as the mold cavity defining members move from the closed position.

2. A method of manufacturing a plastic article having a generally planar wall portion and an integrally formed rib portion extending at an angle from said wall portion, the method comprising the steps of:

positioning mold means, comprising a plurality of mold forming members including means for defining at least one rib portion forming cavity member, to a closed position defining a cavity corresponding in configuration to the plastic article, the rib portion forming means defining along the length of the rib portion forming cavity a plurality of bosses of generally cylindrical axial cross section, the axis of the bosses lying in the plane of the rib and extending from the wall portion a predetermined distance beyond the rib portion forming cavity, the rib portion forming means including a plurality of axially movable pins, each of said pins being aligned with a corresponding boss defining portion of the mold cavity;

injecting molten thermoplastic material into the cavity;

pausing for an initial cooling period to permit partial cooling of the thermoplastic material;

moving the pins a first predetermined distance in an injecting direction toward the wall portion, thereby injecting a predetermined amount of plastic from the boss extensions into the rib forming portion of the mold cavity;

pausing for a final cooling period to permit complete setting of the material;

moving the pins in the injecting direction relative to the surface defining elements as the cavity forming members are moved from the first position to facilitate ejection of the rib portion from the rib forming member.

3. A method of manufacturing a plastic article having at least one generally planar wall portion with at least one integrally molded rib portion extending orthogonally from the wall portion, said method comprising the steps of:

positioning mold means in a closed position to define a mold cavity corresponding to the configuration of the plastic article, said mold means comprising a plurality of mold cavity forming members including means for defining at least one rib cavity, said rib forming means including boss defining channels spaced along the length of the rib forming cavity extending from and generally parallel to the rib forming cavity, and a plurality of axially movable pins mounted in the channels for axial movement between an initial position remote from the rib forming cavity and an ejecting position extending a predetermined distance into the rib forming cavity;

injecting molten thermoplastic material into the mold defining cavity;

pausing for a predetermined time to permit partial cooling of the thermoplastic material;

moving the pins to a predetermined injecting position between their initial position and their ejecting position, thereby injecting a predetermined amount of material from the boss forming cavity into the rib forming cavity;

pausing to permit final cooling and setting of the thermoplastic material in the cavity; and displacing the mold means from its closed position and moving the pins to their ejecting position, thereby ejecting the rib portion of the plastic article from the rib cavity.

* * * * *